US012793078B2

(12) United States Patent
Sanctis et al.

(10) Patent No.: US 12,793,078 B2
(45) Date of Patent: Nov. 10, 2026

(54) TRANSFERRING AUTHENTICATION BETWEEN AN EXTENDED REALITY (XR) DEVICE AND A SMART CARD

(71) Applicant: Bank of America Corporation, Charlotte, NC (US)

(72) Inventors: Jennifer Sanctis, Charlotte, NC (US); Mary Bangs, New York, NY (US); Veronica Andrea Cadavid, New York, NY (US); Taylor Farris, Hoboken, NJ (US); Trish Gillis, Chicago, IL (US); Jesse James Godley, Charlotte, NC (US); Brian Meyers, New York, NY (US); Vishwas Korde, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 147 days.

(21) Appl. No.: 18/220,368

(22) Filed: Jul. 11, 2023

(65) Prior Publication Data

US 2025/0021985 A1 Jan. 16, 2025

(51) Int. Cl.

*G06Q 20/40* (2012.01)
*G06Q 20/32* (2012.01)
*G06Q 20/34* (2012.01)

(52) U.S. Cl.

CPC ......... *G06Q 20/409* (2013.01); *G06Q 20/321* (2020.05); *G06Q 20/352* (2013.01)

(58) Field of Classification Search

CPC .. G06Q 20/409; G06Q 20/352; G06Q 20/321; G06Q 20/4014; G06Q 20/405; G06F 3/165; H04B 5/0006; H04L 9/9213

USPC ......................................... 705/44; 726/7, 21

See application file for complete search history.

(56) References Cited

U.S. PATENT DOCUMENTS

| | | | | |
|---|---|---|---|---|
| 11,133,929 | B1 * | 9/2021 | Shahidzadeh | H04L 9/0891 |
| 11,367,323 | B1 * | 6/2022 | Shahidzadeh | G07C 9/215 |
| 12,056,975 | B1 * | 8/2024 | Shahidzadeh | G06F 21/32 |
| 2016/0247156 | A1 * | 8/2016 | Hwang | G06Q 20/405 |
| 2016/0307183 | A1 * | 10/2016 | Faith | G06Q 20/325 |
| 2018/0137512 | A1 * | 5/2018 | Georgiadis | H04L 63/08 |
| 2018/0225671 | A1 * | 8/2018 | Brown | H04L 63/0861 |
| 2018/0229689 | A1 * | 8/2018 | Brown | G07C 9/00571 |
| 2018/0232514 | A1 * | 8/2018 | Brown | H04L 63/107 |
| 2018/0232718 | A1 * | 8/2018 | Brown | G06Q 20/363 |
| 2018/0232740 | A1 * | 8/2018 | Brown | G06F 21/32 |

(Continued)

*Primary Examiner* — Hani M Kazimi
*Assistant Examiner* — Sanjeev Malhotra
(74) *Attorney, Agent, or Firm* — Wels & Arons LER

(57) ABSTRACT

A computer program product and method for a user to obtain an authentication to an account with a first user device and transfer the obtained authentication to a second user device. The first user device may be a wearable device, such as an XR device like smart glasses, and the second user device may be a smart card, or vice versa. The authentication transfer may enable both devices to be used by the user to access the same account simultaneously. The authentication transfer may also enable the transfer of a stronger authentication that may be obtained on a first user device (e.g., biometric indicia) to a second user device that does not have a capability to obtain the stronger authentication. This may provide the second user device with account access that may otherwise not be available to the second user device or to greater access to the account.

20 Claims, 5 Drawing Sheets

(56) References Cited

U.S. PATENT DOCUMENTS

2018/0234418 A1* 8/2018 Brown ................ H04L 63/0876
2018/0268476 A1* 9/2018 Brown ................... G06Q 30/08
2018/0295514 A1* 10/2018 Brown ................ H04W 12/069
2018/0316670 A1* 11/2018 Brown ................ H04L 63/0884
2018/0316671 A1* 11/2018 Brown ................ H04L 63/0884
2019/0213311 A1* 7/2019 Tussy ..................... G06V 40/70
2019/0260737 A1* 8/2019 Brown .................. H04W 12/08
2019/0287109 A1* 9/2019 Brown .................. H04L 63/101
2019/0287110 A1* 9/2019 Brown ................ H04L 63/0876
2019/0311102 A1* 10/2019 Tussy ..................... G06V 40/67
2020/0042685 A1* 2/2020 Tussy .................. H04L 63/0861
2020/0228520 A1* 7/2020 Thampi ................... G06F 21/33
2020/0293644 A1* 9/2020 Tussy ..................... G06V 10/17
2020/0394290 A1* 12/2020 Tussy ..................... G06V 40/45
2020/0410076 A1* 12/2020 Tussy ...................... G06F 21/31
2021/0011986 A1* 1/2021 Tussy ...................... G06F 21/32
2021/0014060 A1* 1/2021 Georgiadis ......... G06Q 20/3829
2021/0312025 A1* 10/2021 Mars ....................... G06T 19/20
2021/0320918 A1* 10/2021 Mars ....................... G06F 3/014
2022/0147605 A1* 5/2022 Tussy ...................... G06F 21/32
2023/0031087 A1* 2/2023 Tussy ...................... G06F 21/53
2023/0139802 A1* 5/2023 Hira ........................ G06F 21/32
705/44
2023/0216844 A1* 7/2023 Thampi ............... H04L 63/0853
726/7
2023/0252116 A1* 8/2023 Siddens .................. G06F 21/31
726/21
2023/0394127 A1* 12/2023 Tussy ...................... G06F 21/32
2023/0409685 A1* 12/2023 Tussy ...................... G06F 21/32
2023/0410116 A1* 12/2023 Dutt ....................... G06Q 10/00
2024/0184510 A1* 6/2024 S .............................. H04B 5/70
2024/0297879 A1* 9/2024 Tussy ...................... G06F 21/32
2024/0346852 A1* 10/2024 Tussy ................. G06K 7/10722
2024/0348603 A1* 10/2024 Tussy ...................... G06F 21/32

* cited by examiner

TRANSFERRING AUTHENTICATION BETWEEN AN EXTENDED REALITY (XR) DEVICE AND A SMART CARD

FIELD OF THE DISCLOSURE

Aspects of the disclosure relate to access control technology for authenticating an identity of a user who accesses an account using more than one user device.

BACKGROUND OF THE DISCLOSURE

A user may, at times, wish to electronically access an account using two or more user devices. An account may be an account at an account provider, such as, for example, a financial institution, a merchant, an online subscription service, or a system that may require a user authentication. The access may, for example, allow the user to make changes to the user's account, to view account details, or to perform a transaction. Generally, each user device that is used to access the account requires a separate user authentication on the device. Thus, if a user accesses an account on two user devices, a separate authentication would be required for each user device. The available types of authentications on each user device may differ, and may possibly affect whether the user can gain access to the account with a particular user device.

SUMMARY OF THE DISCLOSURE

It is an object of this invention to provide an apparatus, methods, and computer program products for reducing the number of authentications that are required.

It is also an object of this invention to enable a user device to access an account at a higher level of authentication with one user device and share this higher level of authentication with another user device which may not be capable of achieving a higher level of authentication on its own.

The apparatus, methods, and computer program products allow for a first electronic authentication that is obtained on one user device to be transferred to and used by the second user device to avoid a need for another electronic authentication to be performed on the second user device. The first user device may be, for example, an extended reality (XR) device and the second user device may be, for example, a smart card, or vice versa. The transfer may include sharing the electronic authentication data by copying the electronic authentication data and transferring the copy of the electronic authentication data from a first user device to a second user device while the original electronic authentication data that was obtained by the first user device is retained for use by the first user device.

An authentication computer program product in accordance with principles of the disclosure may include executable instructions that, when executed by a processor on a computer system, electronically authenticate, by a user, a first user device by providing information from the user to verify an identity of the user and obtaining, in response, first electronic authentication data at the first user device. The executable instructions may further electronically transfer the first electronic authentication data from the first user device to a second user device. The second user device may be configured to use the first electronic authentication data to authenticate the second user device. One of the first user device or the second user device may include an extended reality (XR) device and another one of the first user device or the second user device may include a smart card.

The XR device may include a first authentication application that may be configured for a user to electronically authenticate an identity of the user using the XR device to provide access to an account of the user. The XR device may include a first communications interface.

The smart card may also be configured to be used to authenticate the identity of the user to provide access to an account of the user or to perform a transaction upon authentication of the smart card. The smart card may include a smart chip. The smart card may include a second authentication application to authenticate the smart card. The smart card may include a second communications interface to enable communications between the XR device and the smart card via the first communication interface and to transfer authentication information to or obtain information from the XR device.

The first authentication application may be configured to provide user security information to the account provider to obtain first electronic authentication data to authenticate the XR device using the XR device. The first authentication application may electronically transfer the first electronic authentication data from the XR device to the smart card. This transfer may enable the smart card to use the first electronic authentication data to authenticate the smart card using the smart card without having to use the smart card to generate second electronic authentication data.

The second authentication application may be configured to obtain the second electronic authentication data to authenticate the smart card and access the account using the smart card. The second authentication application may electronically transfer the second electronic authentication data from the smart card to the XR device. This transfer may enable the smart card to use the second electronic authentication data to authenticate the XR device using the XR device without having to use the XR device to generate the first electronic authentication data.

The XR device may be configured to display on the XR device digital data generated by the smart card. The XR device may be configured to display to the user one or more options that are available in conjunction with use of the smart card. The first and second communication interfaces may be used to communicate digital data or data regarding one or more options available at the smart card from the smart card to the XR device.

One or more of the first electronic authentication data and the second electronic authentication data may be configured to be set at one of a plurality of authentication levels that each provides a different authentication strength. One of the XR device or the smart card may be configured to be set to a higher level of electronic authentication selected from one of the plurality of authentication levels that may be unavailable on the other of the XR device or the smart card. The electronic transfer of the first electronic authentication data from the first user device to a second user device may be performed when one of the XR device or the smart card provides a higher level of electronic authentication to provide the higher level of electronic authentication for both the XR device and the smart card.

The XR device may include a sensor that may be configured to capture biometric information of the user. The XR device may be configured to be authenticated with the biometric information to obtain the first electronic authentication data. The biometric information may include one or more of a fingerprint, a retinal scan, facial recognition, voice recognition or another type of biometric information. The XR device may include one of smart glasses or an augmented reality, virtual reality, or mixed reality headset.

The smart card may be configured to be authenticated with a password to obtain the second electronic authentication data. The smart card may be configured to be used at an automated teller machine (ATM) or at a point of sale (POS). The smart card may be configured to be authenticated using a smart card reader to enter the user security information.

The first or second electronic authentication data may be used to access the account of the user at a financial institution or a user account elsewhere.

A method in accordance with principles of the present disclosure may enable the transfer of authentication between two user devices. The method may include authenticating electronically, by a user, a first user device by providing information from the user to verify an identity of the user and obtaining, in response, first electronic authentication data at the first user device. The method may include electronically transferring the first electronic authentication data from the first user device to a second user device. The second user device may be configured to use the first electronic authentication data to authenticate the second user device. One of the first user device or the second user device may include an extended reality (XR) device and another one of the first user device or the second user device may include a smart card.

The method may include pairing the XR device and the smart card, and transferring the first electronic authentication data between the XR device and the smart card wirelessly. The method may include displaying to the user on the XR device one or more options that are available for use in conjunction with the smart card. The method may include displaying digital data generated by the smart card on the XR device.

One or more of the first electronic authentication data and the second electronic authentication data may be configured to be set at one of a plurality of authentication levels that each provides a different authentication strength. One of the XR device or the smart card may be configured to be set to a higher level of electronic authentication selected from one of the plurality of authentication levels that is unavailable on the other of the XR device or the smart card. The electronic transfer of the first electronic authentication data from the first user device to a second user device may be performed when one of the XR device or the smart card provides a higher level of electronic authentication so as to provide the higher level of electronic authentication for both the XR device and the smart card.

The XR device may further include a sensor that may be configured to capture biometric information of the user. The biometric information may be used to obtain the first electronic authentication data. The smart card may be configured to be authenticated with a password to obtain the second electronic authentication data.

The XR device may include one of smart glasses or an augmented reality, virtual reality, or mixed reality headset. The smart card may be configured to be authenticated using a smart card reader to enter the user security information.

The verification of the user identity may provide the user with access to an account of the user. The verification of the user identity may enable authorization for the user to perform a transaction.

BRIEF DESCRIPTION OF THE DRAWINGS

The Objects and Advantages of the Disclosure Will be Apparent Upon Consideration of the Following Detailed Description, Taken in Conjunction with the Accompanying Drawings, in which Like Reference Characters Refer to Like Parts Throughout, and in which.

DETAILED DESCRIPTION OF THE DISCLOSURE

Figure 1:
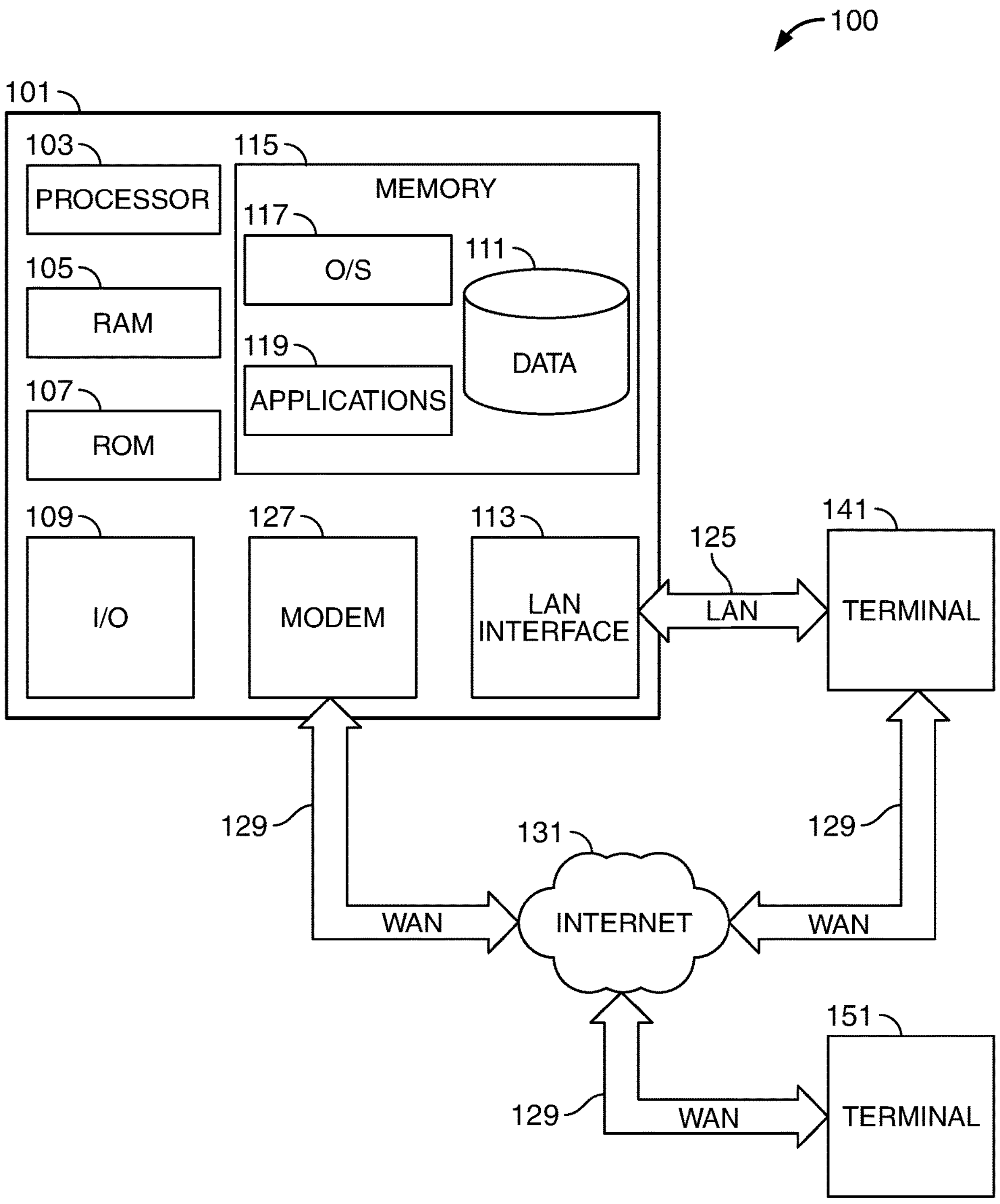
FIG. 1 shows an illustrative system architecture in accordance with principles of the disclosure.

The present disclosure relates to computer program products, system, and methods for transferring authentication between user devices, wherein a first user device includes an extended reality ("XR") device and a second user device includes a smart card. The authentication may be transferable in one direction, i.e., from XR device to smart card or from smart card to XR device, or may be transferable in either direction.

The XR device may include, for example, a pair of smart glasses, a headset that may be worn by a user, or another wearable device. The headset may be an Augmented Reality (AR), Virtual Reality (VR), or Mixed Reality (MR) headset. The XR device may include an XR interface on a user-facing surface.

The XR device may include a communications interface to enable communications between the XR device and the smart card. The communications interface may permit pairing between the XR device and a nearby smart card. In embodiments, the XR device may communicate with the smart card via a Bluetooth, Zigbee, a wireless optical networking technology, such as Li-fi, or a near field communication (NFC) link. A communications interface may also permit communications between the XR device and the smart card over a network, such as the Internet, or a wireless communications network.

The XR device may include a communications interface which may be configured for a user to electronically access an account using an electronic authentication. The account may be an account at a financial institution or at another account provider. Communications between the XR device and the account provider may be exchanged over the Internet or over another WAN, LAN, or other communications network, such as a wireless communications network.

The XR device may include an authentication application that may be used to authenticate the XR device. The XR device may be configured to permit an authentication that is a single-factor authentication or a multi-factor authentication. In a single-factor authentication, a single credential may be sufficient to log in. In multi-factor authentication, multiple pieces of data are required. The authentication may be entered via an on-screen input, a sensor on an XR device, or via an external sensor or device coupled to the XR device. The XR device may include an input, such as an on-screen input or a keyboard coupled to the XR device, to enter a password, like a personal information number (PIN), or an authentication code. The XR device may have a sensor to capture one or more biometric indicia of the user, such as, for example, a fingerprint, a retinal scan, facial recognition, and voice recognition. The captured biometric information may be used as the first electronic authentication data.

The XR device may provide different levels of authentication to access an account. For example, a password or PIN alone may provide a lower level of authentication, while biometric information may provide a higher level of authentication. A higher level of authentication may be needed, for example, to access certain accounts or to gain a greater amount of access to use the accounts.

The smart card may include a smart chip that is an integrated circuit chip, such as an "EMV" chip. EMV is a technology that derives its name from the companies (Europay, MasterCard, and Visa) that helped develop the technology. An EMV chip typically may be programmed to store a computer program. The computer program is typically stored on the EMV chip by an issuer of the card.

The smart card may include a communications interface, may include an interface to a communication circuit. The communication circuit may be capable of wired transmission. The communication circuit may be configured to implement protocols for wireless communication. For example, the communication circuit may provide functionality for conducting near field communication ("NFC"), Li-fi, Wi-Fi, Bluetooth, or any other suitable form of wireless communication. Wi-Fi may include passive Wi-Fi with lower power consumption than typical Wi-Fi. The communications interface on the smart card may be configured to enable communications between the XR device and the smart card via the first communication interface, and communications between the smart card and the account provider.

The smart card may be configured to access the same account as the XR device upon authentication of the smart card. The smart card may include its own authentication application to authenticate the smart card.

The smart card may be configured to interact with a smart card reader at which the smart card may be read and at which authentication information may be input. The smart card may be configured to be used at an automated teller machine (ATM) or at a point of sale (POS) that is configured to interact with smart cards.

The first authentication application at the XR device may be configured to obtain a first electronic authentication data to authenticate the XR device and access the account using the XR device. The first authentication application may be configured to electronically transfer the first electronic authentication data from the XR device to the smart card. The transfer may enable the smart card to use the first electronic authentication data to authenticate the smart card and to permit access to the account at the account provider using the smart card without the smart card obtaining a second electronic authentication.

The second authentication application at the smart card may be configured to obtain the second electronic authentication data to authenticate the smart card and access the account using the smart card. The second authentication application may be configured to electronically transfer the second electronic authentication data from the smart card to the XR device to enable the smart card to use the second electronic authentication data to authenticate the XR device and to permit access to the account using the smart card without the XR device obtaining the first electronic authentication data.

The electronic authentication data may be stored as a record, such as in the form of an authentication certificate or ticket or some other electronic proof of authentication, at the device at which the user has established an authentication. The electronic authentication data may be stored at the XR device or at the smart card. This data, such as the authentication certificate or ticket, may be transferred from one device to the other, such as from the XR device to the smart card or from the smart card to the XR device. As used herein, the transfer may include an actual transfer or may include sharing the electronic authentication data by copying the electronic authentication data and transferring the copy of the electronic authentication data from a first user device to a second user device while the original electronic authentication data that was obtained by the first user device is retained for use by the first user device.

One or more of the first electronic authentication data and the second electronic authentication data may be set to one of a plurality of authentication levels that each provides a different authentication strength. One of the XR device or the smart card may be set to a higher level of electronic authentication at one of the plurality of authentication levels that may be unavailable on the other of the XR device or the smart card. The higher level of electronic authentication may be usable to authenticate the XR device and the smart card.

The account provider may require the higher level of authentication to access the account. The user may use the XR device to provide the higher level of authentication and, if desired, transfer the authentication to the smart card so that the user may access the account with the smart card.

When the XR device and the smart card are paired, the XR device may be configured to display on the XR device digital data generated by the smart card. The digital data that is displayed may include information such as information about the smart card, account information, information that is accessible by logging into the account, advertisements or promotions, links to one or more web sites, or other information. The XR device may also be configured to display to the user one or more options that are available in conjunction with use of the smart card.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smartphones, multi-processor systems, microprocessor-based systems, cloud-based systems, programmable consumer electronics, network PCs, minicomputers, mainframe computers, distributed computing environments that include any of the above systems or devices, and the like.

Figure 2:
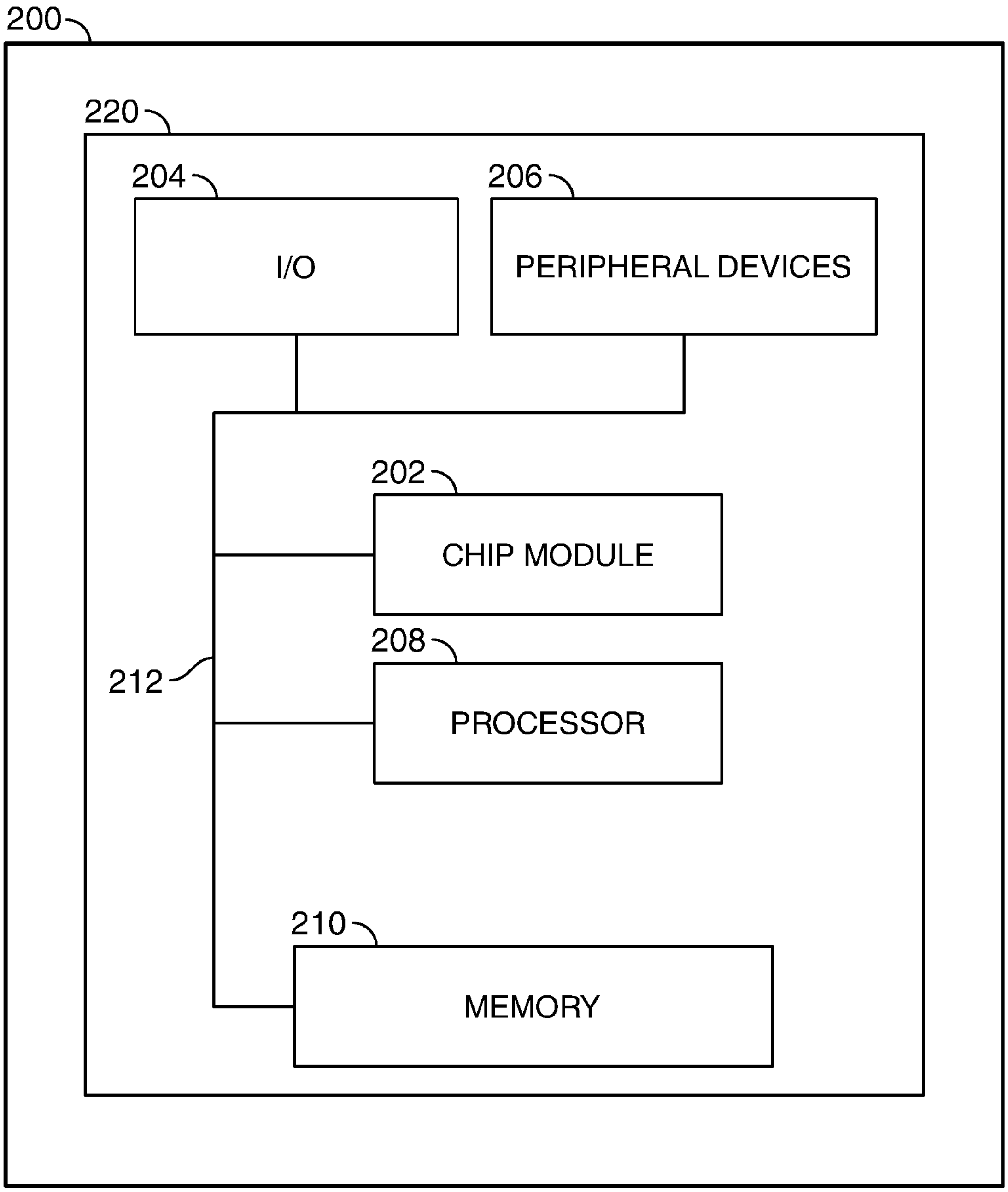
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
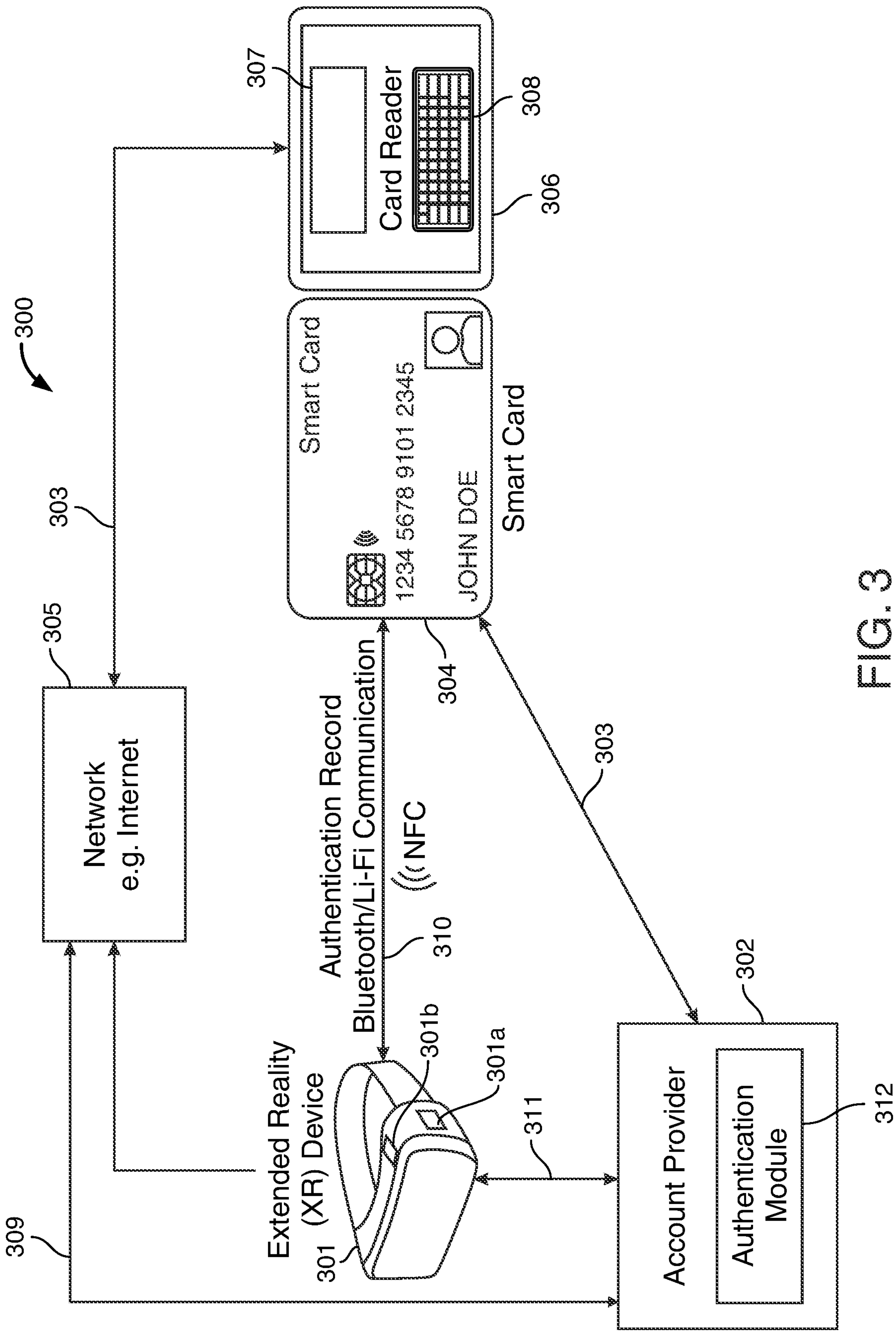
FIG. 3 shows an illustrative example of an XR device and a smart card that may be able to separately access a user account using a single electronic authorization in accordance with principles of the disclosure.

FIG. 3 shows an illustrative example of a system 300 that may include an XR device 301 of a user, an account provider 302, such as a financial institution, and a smart card 304 of the user that may communicate with each other. Communications between XR device 301, account provider 302, and smart card 304 may use wireless communications. Examples of short range wireless communication technologies that may be used include Bluetooth, Zigbee, a wireless optical networking technology, such as Li-fi, or a near field communication (NFC) link 310. Where wireless communications are available, smart card 304 may be configured to communicate directly over link 310 when XR device 301 and account provider 302 are within the available wireless range of one another. Account provider 302 and smart card 304 may wirelessly communicate over link 303. Account provider 302 and XR device 301 may wirelessly communicate over link 311.

Communications between two or more of XR device 301, an ATM or POS of account provider 302, and smart card 304 may also communicate via a network 305, such as the Internet. Communications between smart card 304 and XR device 301 or account provider 302 may take place over network 305 and may use a smart card reader 306 to communicate with network 305.

Smart card 304 may communicate with smart card reader 306 by wireless communication or by inserting smart card 304 into a slot. Smart card reader 306 may be a personal smart card reader located remotely from an account provider 302 to enable transactions with the account provider 302. Smart card reader 306 may be associated with account provider 302 and may be located at the account provider 302, such as at the ATM or at a POS.

XR device 301 and smart card 304 may include respective authentication applications that may be configured to authenticate a user to provide a user with access to the user's account with the account provider and to obtain an electronic authentication record from account provider 302. The respective authentication applications may each transfer the obtained authentication from one device to the other, i.e., from XR device 301 to smart card 304 or from smart card 304 to XR device 301. Account provider 301 may have an authentication module 312 that may obtain information from the user to authenticate the user and provide an authentication record to the device used to obtain the authentication, XR device 301 and smart card 304 may include applications that provide for the transfer of an electronic authentication. This may occur while the electronic authentication obtained by one device is still active and has not expired or otherwise lapsed. In embodiments, the transfer of authentication may occur when one device (the XR device or the smart card) requests authentication from the other device (the smart card or the XR device) when the two devices are in communication, such as when the devices are paired. This may occur when the account provider 302 requires a type of authentication, such as a higher level of authentication, that may only be available on one of the devices, e.g., XR device 301. If the other device has already been authenticated with account provider 302, it may transfer the authentication to the requesting device. Alternatively, after one device obtains an authentication, the transfer of authentication may be pushed from one device to other connected devices of the user. This transfer of authentication may be limited in cases where account provider 302 sets the authentication to be non-transferable.

The authentication that is generated at a first device and transferred to a second device may be used by the second device. This may be performed by providing, by the second device, a record of the authentication by the first device to account provider 302.

XR device 301 may include a communications interface **301*a* to enable communications between XR device 301 and the smart card 304. The communications interface 301*a* may permit pairing between XR device 301 and smart card 304. XR device 301 may have a screen which may be interactive to allow data to be displayed and data to be entered. XR device 301 may also be paired with sensors or input devices, such as a keyboard, to enter a password, like a personal information number (PIN), or an authentication code. XR device 301 may include a sensor 301*b* to capture biometric information of the user, such as, for example, a fingerprint, a retinal scan, facial recognition, and voice recognition. The biometric information may be used as the first electronic authentication data. The input or sensor 301*b* may form part of an authentication application at XR device 301** that may be used to authenticate the XR device.

Figure 4:
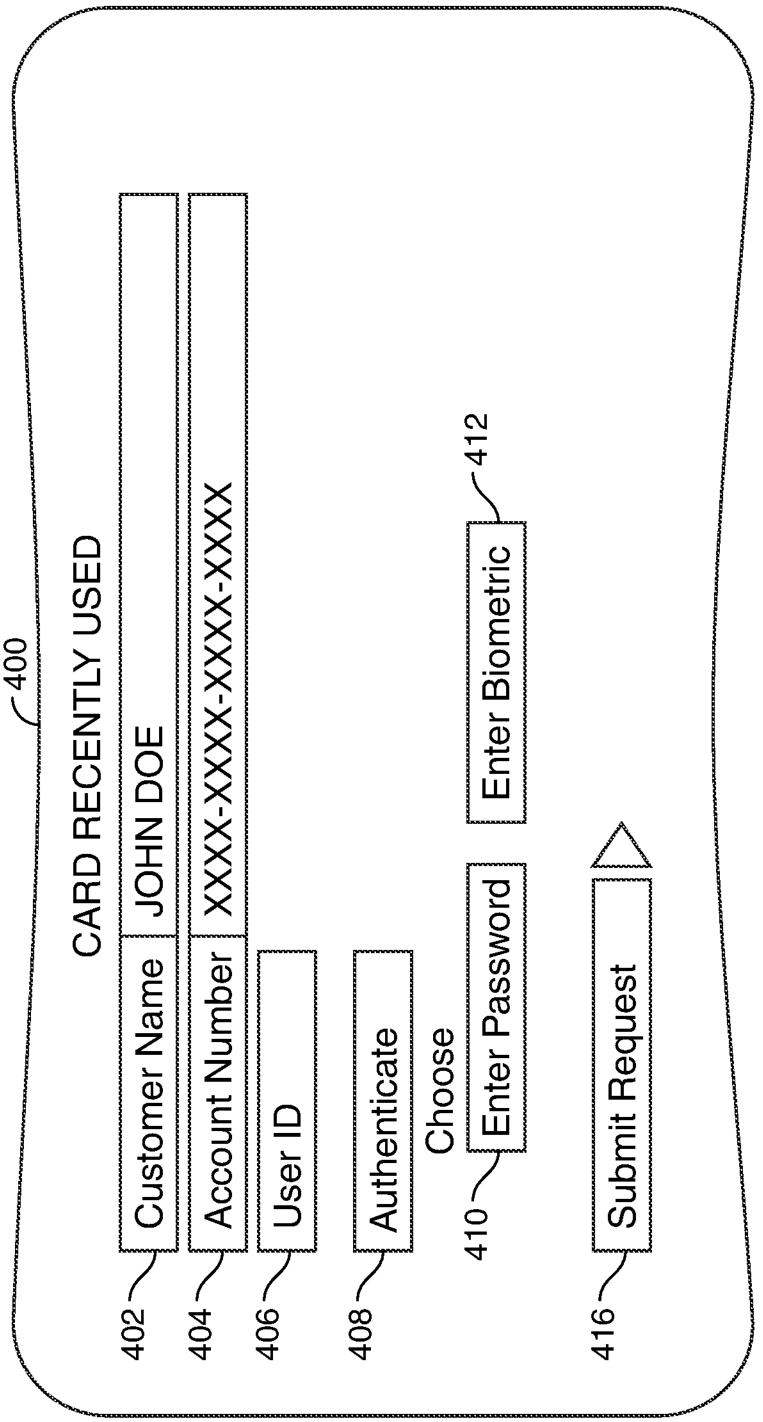
FIG. 4 shows an illustrative screen that may be displayed on an XR device to obtain authentication of a user in accordance with principles of the disclosure.

FIG. 4 shows an illustrative screen 400 that may be displayed on an inner face of XR device 301. Screen 400 may be used to display information related to authentication of XR device 301. Screen 400 may also be used to display information associated with smart card 304 where XR device 301 and smart card 304 are paired. Various types of information may be shown on screen 400. In the illustrated example, the fields that may be displayed on screen 40 may include, for example, a customer name 402, an account number 404 if applicable, or a card type 406 for display if the account relates to a card, such as a credit or debit card.

Screen 400 may include one or more field to enter information to obtain a type of authentication information. Under the heading "Authenticate" 408, screen 400 may provide an option to choose the type of authentication that the user wishes to provide. Choosing a stronger type of authentication, such as providing biometric indicia, may provide greater user access to an account. For example, choices may include entry of a code 410 or entry of biometric information 412 or both. Biometric information 412 may be entered through sensor 301*b*, for example. A button 418 may be provided to submit a request to authenticate a device based on the provided information.

Authentication information for authenticating XR device 301 may be entered in various ways. As one way, the information may be entered as textual or biometric inputs on or associated with XR device 301. To authenticate smart card 304, smart card reader 306 may be authenticated by entry of a password (such as a PIN number). The authentication information to be entered on either XR device 301 or smart card 304 may be previously established for the account to be accessed by the user or the entity that is authenticating the user. For example, a password or biometric may have been previously specified. The authentication process may compare the authentication information input by a user with the information already on record with account provider 302. If the input authentication information matches the previous information, an authentication record may be transmitted to the device requesting the authentication, whether it XR device 301 or smart card 304. The authentication record may thereafter be transferred to the other device that has not yet requested authentication so the other device will be granted access to whatever account that the other device has authorization to use. It may be advantageous for one device, such as XR device 301, to alert account provider 302 when it is transferring authorization to another device. The user may then account provider 302 using both devices based on the authentication that has been obtained.

Smart card 304 and XR device 301 may be paired. In this case, digital data generated by smart card 304 may be displayed on screen 400. The digital data may include one or more options that may be available in conjunction with use of smart card 304. Smart card 304 may therefore be authenticated by viewing and entering information using XR device 301. Alternatively, smart card 304 may be authenticated using smart card reader 306 that may be used to authenticate smart card 304. Smart card reader 306 may include a display 307 to view information associated with smart card 304 and the authentication of the smart card, and an input 308, such as a keypad to enter information required to authenticate smart card 304.

Figure 5:
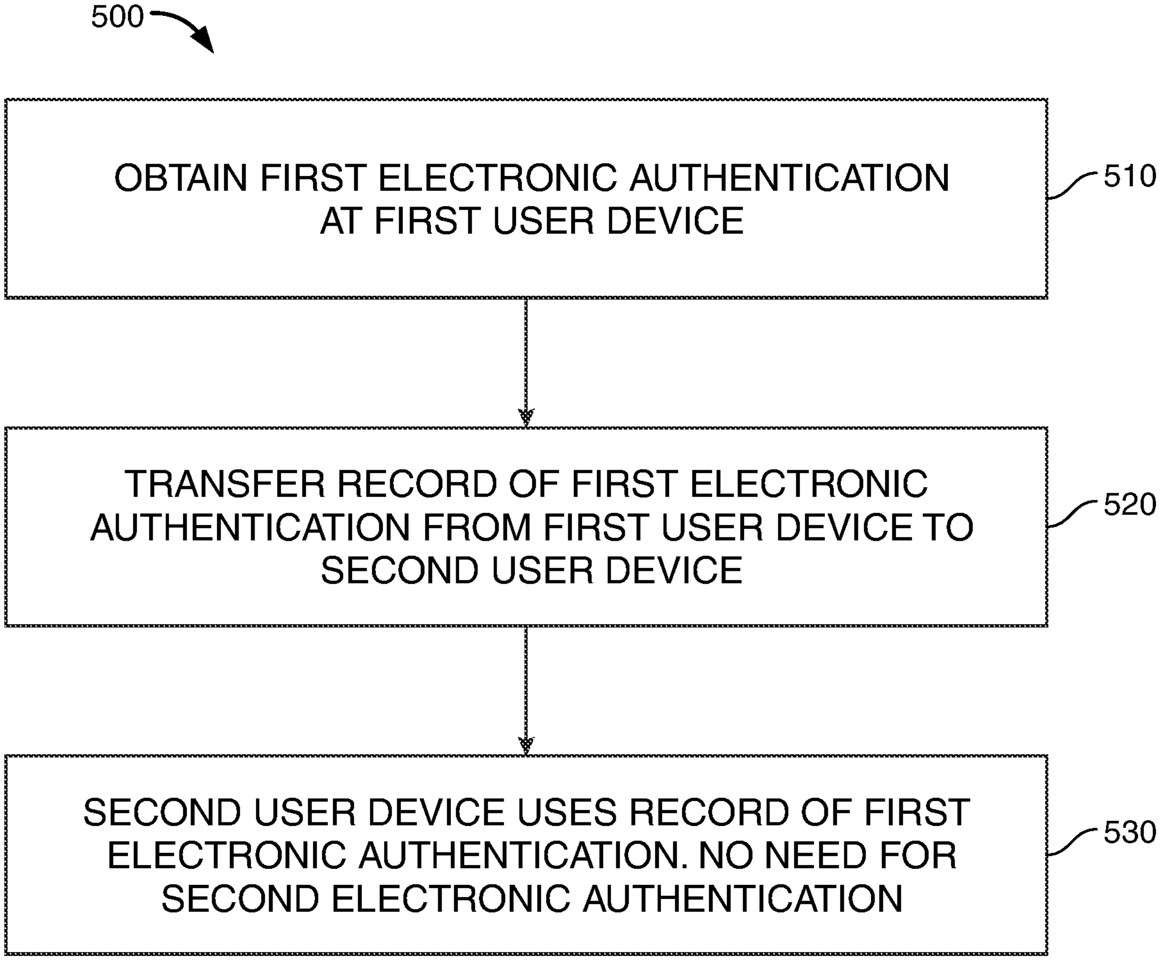
FIG. 5 shows an illustrative example of a flow chart for performing a method for transferring an authentication from one device to another device in accordance with principles of the invention.

FIG. 5 shows an illustrative example of a flow chart 500 for performing a method for transferring authentication between devices to access the devices without separately authenticating with the account provider one of the devices.

At step 510, a first user device of a user may obtain a first electronic authentication data from the user to be provided to an account provider to verify an identity of the user. A successful authentication may allow the user to gain access to the account using the first user device. The first user device may be XR device 301 or smart card 304. This step may include an attempt by the user to access an online account using the first user device. The user may be prompted for user authentication information. The user may provide the requested authentication information either directly via the first user device (e.g., via the XR device 301) or via a device coupled to the first user device (e.g., a smart card reader that is used in conjunction with the smart card). If the user successfully authenticates the first user device, the user may receive a first electronic authentication, which may be received as an electronic authentication record that may be stored at the first user device.

Where the first user device is a smart card, rather than using a smart card reader to access the smart card, the smart card may be paired with the XR device to display on XR device 301 one or more options that are available for use in conjunction with smart card 304. XR device 301 may also be used to display data stored on or generated by the smart card. XR device 301 may also be used to interact with the account provider, authenticate the smart card, and obtain the first electronic authentication on behalf of the smart card 304.

At step 520, the first electronic authentication record obtained by the first user device may be transferred to the second user device, i.e., the device not already authenticated. The first electronic authentication data may be, for example, a password or biometric data. The transfer may be pushed from one device to another or may be requested by the second user device. The authentication at the first and second user devices may provide the user with access to an account of the user. The access may include access to perform a transaction.

At step 530, the second user device may use the first electronic authentication data that has been obtained from the first user device to verify the identity of the user of the second user device so that a second electronic authentication need not be performed at the second user device.

One or more of the first electronic authentication data and the second electronic authentication data may correspond to one of a plurality of authentication levels that each provides a different authentication strength. One of the XR device or the smart card may be configured to be set to a higher level of electronic authentication at one of the plurality of authentication levels that is unavailable authentication setting on the other of the XR device or the smart card. The higher level of electronic authentication that is available at one of the XR device or the smart card may be used to electronically authenticate the XR device and the smart card.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may implement access control by two user devices with a single authentication by one of the user devices. Persons skilled in the art will appreciate that the present invention can be practiced by other than the described embodiments, which are presented for purposes of illustration rather than of limitation.

What is claimed is:

1. An authentication computer program product stored on a non-transitory computer readable medium that comprises executable instructions that, when executed by a processor on a computer system:

electronically authenticate a user at a first user device using information obtained from the user at the first user device to verify to an account provider or system an identity of the user at a first level of authentication and obtaining, in response, electronic authentication data at the first user device that represents that the user has been verified at the first level of authentication;

wherein a second user device is configured to electronically authenticate the user at a second level of authentication but is not configured to perform authentication of the user at the first level of authentication, and the first level of authentication has a higher level of authentication than the second level of authentication;

and the first user device electronically transfers an electronic proof of authentication comprising the electronic authentication data to a second user device; and provide, by the first user device or the second user device to the account provider or system, an electronic record that the second user device has been authenticated at the first level of authentication based on the electronic proof of authentication;

wherein the second user device is further configured to use the electronic authentication data that is received from the first user device that authenticates the user at the first level of authentication at the second user device to enable the user to access an account or the system at the second user device at the first level of authentication such that the identity of the user is verified at the higher level of authentication at the second user device without the second user device performing additional electronic authentication of the user at the second user device; and wherein one of the first user device or the second user device comprises an extended reality (XR) device and another one of the first user device or the second user device comprises a smart card.

2. The computer program product of claim 1, wherein:

the first user device comprises a first one of an extended reality ("XR") device comprising:

a first authentication application configured for a user to electronically authenticate an identity of the user using the XR device to provide access to the account of the user or to the system; and a first communications interface; or a smart card comprising a smart chip, wherein the smart card is configured to be used to authenticate the identity of the user to provide access to the account of the user or to the system upon authentication of the smart card, the smart card comprising:

a second authentication application to authenticate the smart card; and a second communications interface to enable communications between the XR device and the smart card via the first communication interface and to transfer authentication information to or from the XR device;

the second user device comprises a second one of the XR device or the smart card that is different from the first user device;

wherein:

the electronic authentication data is first electronic authentication data; and the first authentication application is configured to:

provide user security information to the provider of the account or the system to obtain the first electronic authentication data to authenticate the XR device using the XR device at the first level of authentication; and electronically transfer the first electronic authentication data from the XR device to the smart card to enable the smart card to use the first electronic authentication data to authenticate the smart card at the first level of authentication using the smart card without having to use the smart card to generate additional electronic authentication data to verify the user at the smart card; or wherein:

the electronic authentication data is second electronic authentication data; and the second authentication application is configured to:

obtain the second electronic authentication data to authenticate the smart card at the first level of authentication and access the account or system using the smart card; and electronically transfer the second electronic authentication data from the smart card to the XR device to enable the smart card to use the second electronic authentication data to authenticate the XR device using the XR device at the first level of authentication without having to use the XR device to generate additional electronic authentication data at the XR device.

3. The computer program product of claim 2, wherein:

one or more of the first electronic authentication data and the second electronic authentication data is configured to be set at one of a plurality of authentication levels that includes the first level of authentication and that each provides a different authentication strength; and one of the XR device or the smart card is configured to be set to the higher level of authentication selected from one of the plurality of authentication levels that is unavailable on another of the XR device or the smart card;

wherein the electronic transfer of the first electronic authentication data or the second electronic authentication data is performed when one of the XR device or the smart card provides the higher level of authentication so as to provide the higher level of authentication for both the XR device and the smart card.

4. The computer program product of claim 2, wherein the account of the user is at a financial institution and the first electronic authentication data is used to access the account of the user at the financial institution.

5. The computer program product of claim 2, wherein:

the XR device further comprises a sensor configured to capture biometric information of the user;

the XR device is configured to be authenticated with the biometric information to obtain the electronic authentication data; and the smart card is configured to be authenticated with a password to obtain the electronic authentication data for use with the smart card.

6. The computer program product of claim 5, wherein the biometric information comprises one of a fingerprint, a retinal scan, facial recognition, or voice recognition.

7. The computer program product of claim 1, wherein the smart card is configured to be used at an automated teller machine (ATM) or at a point of sale (POS).

8. The computer program product of claim 1, wherein the XR device is configured to display, on the XR device, digital data generated by the smart card.

9. The computer program product of claim 1, wherein the XR device is configured to display to the user one or more options that are available in conjunction with use of the smart card.

10. The computer program product of claim 1, wherein the XR device comprises one of smart glasses or an augmented reality, virtual reality, or mixed reality headset.

11. The computer program product of claim 1, wherein the smart card is configured to be authenticated using a smart card reader to enter user security information.

12. A method for transferring authentication between two user devices, comprising:

electronically authenticating a user, by a processor at a first user device, using information obtained from the user at the first user device using a sensor or input device that is configured to verify to an account provider or system an identity of the user at a first level of authentication and obtaining, in response, electronic authentication data at the first user device that represents that the user has been verified at the first level of authentication;

electronically transferring, by the processor, an electronic proof of authentication comprising the electronic authentication data from the first user device to a second user device, wherein the second user device is configured to electronically authenticate the user at a second level of authentication but is not configured to perform authentication of the user at the first level of authentication, and the first level of authentication is at a higher level of authentication than the second level of authentication; and providing, by the first user device or the second user device to the account provider or system, an electronic record that the second user device has been authenticated at the first level of authentication based on the electronic proof of authentication;

wherein the second user device is configured to use the electronic authentication data that is received from the first user device that authenticates the user at the first level of authentication at the second user device to enable the user to access an account or the system at the second user device at the first level of authentication with the account provider or system such that the identity of the user is verified at the higher level of authentication at the second user device and without the second user device performing additional electronic authentication of the user;

wherein one of the first user device or the second user device comprises an extended reality (XR) device and another one of the first user device or the second user device comprises a smart card.

13. The method of claim 12, further comprising:

pairing the XR device and the smart card; and transferring the electronic authentication data between the XR device and the smart card wirelessly.

14. The method of claim 12, further comprising displaying to the user on the XR device one or more options that are available for use in conjunction with the smart card.

15. The method of claim 12, further comprising displaying digital data generated by the smart card on the XR device.

16. The method of claim 12, wherein:

one or more of the first electronic authentication data and the second electronic authentication data is configured to be set at one of a plurality of authentication levels, that includes the first level of authentication, and that each provides a different authentication strength; and one of the XR device or the smart card is configured to be set to a higher level of authentication selected from one of the plurality of authentication levels that is unavailable on another of the XR device or the smart card; and the electronic transfer of the first electronic authentication data or the second electronic authentication data is performed when one of the XR device or the smart card provides the higher level of authentication so as to provide the higher level of authentication for both the XR device and the smart card.

17. The method of claim 12, wherein:

the first user device is the XR device that comprises or is coupled to the sensor or input device;

the sensor or input device is configured to capture the electronic authentication data that comprises biometric information of the user; and the smart card is configured to be authenticated with a password to obtain the electronic authentication data; and the method further comprises:

using the biometric information that is captured using the XR device to obtain the first level of authentication at the XR device; and upon electronically transferring the authentication data comprising the biometric information of the user from the XR device to the smart card, using the authentication provided by the biometric information to provide the smart card with the higher level of authentication.

18. The method of claim 12, wherein the XR device comprises one of smart glasses or an augmented reality, virtual reality, or mixed reality headset.

19. The method of claim 12, wherein the smart card is configured to be authenticated using a smart card reader to enter the user security information.

20. The method of claim 12, wherein the authentication provides the user with access to an account of the user.

* * * * *